United States Patent
Higle

(10) Patent No.: US 10,618,365 B2
(45) Date of Patent: Apr. 14, 2020

(54) VEHICLE AXLE ARRANGEMENT

(71) Applicant: Dr. Ing. h.c. F. Porsche Aktiengesellschaft, Stuttgart (DE)

(72) Inventor: Andreas Higle, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 212 days.

(21) Appl. No.: 15/903,446

(22) Filed: Feb. 23, 2018

(65) Prior Publication Data

US 2018/0244120 A1  Aug. 30, 2018

(30) Foreign Application Priority Data

Feb. 24, 2017 (DE) .......................... 10 2017 103 898

(51) Int. Cl.
*B60G 11/12* (2006.01)
*B60G 11/10* (2006.01)
*B60G 11/08* (2006.01)

(52) U.S. Cl.
CPC .............. *B60G 11/12* (2013.01); *B60G 11/08* (2013.01); *B60G 11/10* (2013.01); *B60G 2202/114* (2013.01); *B60G 2204/121* (2013.01)

(58) Field of Classification Search
CPC ......... B60G 11/08; B60G 11/10; B60G 11/12; B60G 2202/114; B60G 2204/121
See application file for complete search history.

(56) References Cited

U.S. PATENT DOCUMENTS

| | | | | | |
|---|---|---|---|---|---|
| 1,536,994 | A | * | 5/1925 | Winsor ................. | B60G 11/08 280/124.113 |
| 1,643,840 | A | * | 9/1927 | Fry ....................... | B60G 11/08 267/36.1 |
| 2,052,056 | A | * | 8/1936 | Stone .................... | B60G 11/08 280/86.751 |
| 2,122,961 | A | * | 7/1938 | Siebler ................. | B62D 17/00 280/86.751 |
| 2,206,970 | A | * | 7/1940 | Megow ................. | B60G 11/08 280/124.103 |

(Continued)

FOREIGN PATENT DOCUMENTS

DE          559308 C       9/1932
DE    102010022895 A1    12/2011

(Continued)

OTHER PUBLICATIONS

German Search Report for German Application No. 10 2017 103 898.1, dated Feb. 7. 2018, with partial English translation, 7 pages.

*Primary Examiner* — Frank B Vanaman
(74) *Attorney, Agent, or Firm* — RatnerPrestia

(57) ABSTRACT

A vehicle axle arrangement of a vehicle wheel suspension system which has a spring arrangement which runs in the vehicle transverse direction in the installed position, steers wheels, and has bearings at the ends which are directed toward the wheels. The bearings are connected via respective bearing arrangements to transverse links which are in turn connected to wheel supports. The transverse links are coupled to a vehicle body. The spring arrangement have two leaf springs of identical configuration which are connected to one another via a coupling member.

8 Claims, 2 Drawing Sheets

(56) References Cited

U.S. PATENT DOCUMENTS

| | | | | | |
|---|---|---|---|---|---|
| 2,471,135 | A | * | 5/1949 | Wyeth | B60G 9/00 |
| | | | | | 267/192 |
| 2,501,796 | A | * | 3/1950 | Tucker | B60G 15/02 |
| | | | | | 280/124.137 |
| 4,779,894 | A | * | 10/1988 | Cowburn | B60G 11/08 |
| | | | | | 267/52 |
| 4,903,984 | A | * | 2/1990 | Kajiwara | B60G 3/205 |
| | | | | | 280/124.14 |
| 4,997,202 | A | * | 3/1991 | Kitagawa | B60G 11/08 |
| | | | | | 267/31 |
| 2003/0122338 | A1 | * | 7/2003 | Carlstedt | B60G 11/08 |
| | | | | | 280/124.134 |
| 2017/0305222 | A1 | * | 10/2017 | Preijert | B60G 11/08 |

FOREIGN PATENT DOCUMENTS

| EP | 2639087 A1 | 9/2013 |
|---|---|---|
| GB | 513682 | 10/1939 |

\* cited by examiner

VEHICLE AXLE ARRANGEMENT

CROSS-REFERENCE TO RELATED APPLICATIONS

This application claims priority to German Patent Application No. DE 10 2017 103 898.1, filed Feb. 24, 2017, which is incorporated by reference herein in its entirety.

FIELD OF THE INVENTION

The invention relates to a vehicle axle arrangement of a vehicle wheel suspension system which has a spring arrangement which runs substantially in the vehicle transverse direction in the installed position, steers wheels, and has bearing means at the ends which are directed toward the wheels, which bearing means are connected via respective bearing arrangements to transverse links which are in turn connected to wheel supports, the transverse links being coupled to a vehicle body.

BACKGROUND OF THE INVENTION

Vehicle axle arrangements are well known from the prior art. For instance, EP 2 639 087 B1, which is incorporated by reference herein, describes a vehicle axle arrangement which is part of a vehicle wheel suspension system, in which a transverse leaf spring which is connected to transverse links is provided. In the case of compression processes of the wheels of a vehicle, a length compensation is performed in the transverse direction of the vehicle wheel suspension system by way of the spring arrangement. The transverse direction may be orthogonal to the forward direction of travel of the vehicle. To this end, in the known embodiment according to EP 2 639 087 B1, which is incorporated by reference herein, a relative movement takes place in the bearing arrangements between the transverse links and the spring arrangement. In the case of mutual compression of the wheels (also called roll), bending moments of different magnitude are produced in the bearing arrangements which connect the spring arrangement to the corresponding transverse links. This can lead to the problem that the spring arrangement can no longer be oriented symmetrically after the roll process on account of different relative movements in the bearing arrangements, which in turn can damage the vehicle wheel suspension system in the relatively long run.

SUMMARY OF THE INVENTION

A spring arrangement has two leaf springs of identical configuration which are connected to one another via a coupling member. As a result of a configuration of this type of the spring arrangement, merely a relative movement in the center of the spring arrangement now takes place, instead of two relative movements at those ends of the spring arrangement which are directed toward the wheels. In addition, there are lower bending moments in the center of the spring arrangement during the mutual compression process (roll) of the wheels. As a result, an asymmetrical orientation of the spring arrangement on account of a non-compensated relative movement can be prevented or reduced effectively.

In one particularly advantageous embodiment, the coupling member has a housing part and a spring member which is provided in said housing part. Here, the spring member can be a rubber element or else a spiral spring. The spring member can ensure a simple relative movement. The housing part can advantageously be configured as a plain bearing, in which those ends of the leaf springs which face away from the wheels are mounted. As an alternative, the plain bearing element is arranged on the leaf springs, in order to protect the leaf springs. In this alternative, the sliding movement takes place within the plain bearing elements which are connected fixedly to the leaf spring.

In one particularly advantageous embodiment, a gaiter member is provided to shield the coupling member. The gaiter member can serve as a protective means against contaminants or else also as a possible lubricant reservoir.

The bearing arrangements can be configured as a bolt-shaped or pin-shaped articulated connection.

It is provided in one advantageous development of the subject matter of the invention that the coupling member is used for the variable adjustment of the spring rates. It is provided here that the coupling member can have its length and/or stiffness changed in an active manner, with the result that an active adaptation of the spring rates is made possible.

BRIEF DESCRIPTION OF THE DRAWINGS

The invention will be described in greater detail using a drawing, in which.

DETAILED DESCRIPTION OF THE INVENTION

Figure 1:
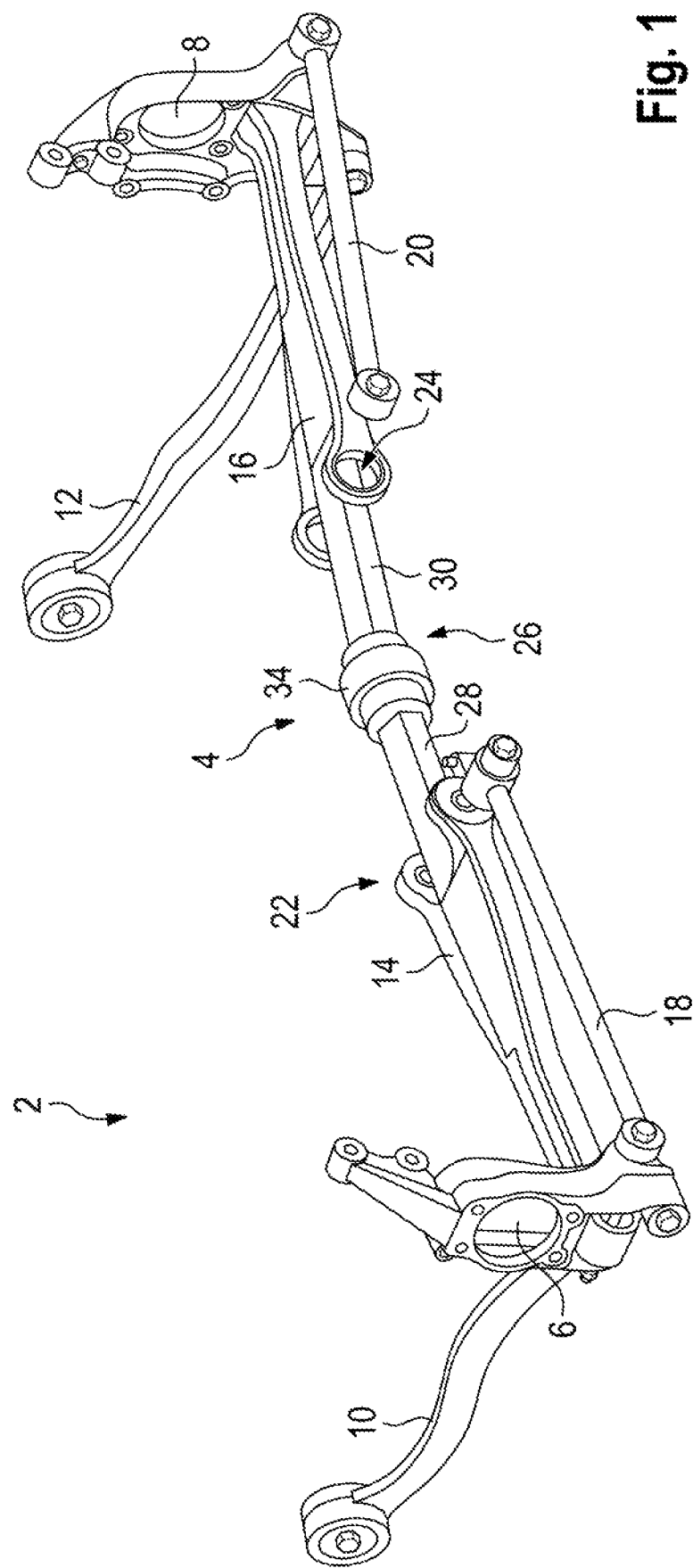
FIG. 1 shows a perspective view of a vehicle wheel suspension system having a vehicle axle arrangement according to aspects of the invention.

FIG. 1 shows a perspective view of a vehicle wheel suspension system 2 having a vehicle axle arrangement 4 according to aspects of the invention. The vehicle axle arrangement 2 has wheel supports 6, 8 in a known manner here, which wheel supports 6, 8 are in turn connected in a known manner to trailing arms 10, 12, first transverse links 14, 16 and further transverse links 18, 20. The transverse links 14, 16, 18 and 20 are in turn connected in a known manner to a vehicle body which is not shown in further detail.

Figure 2:
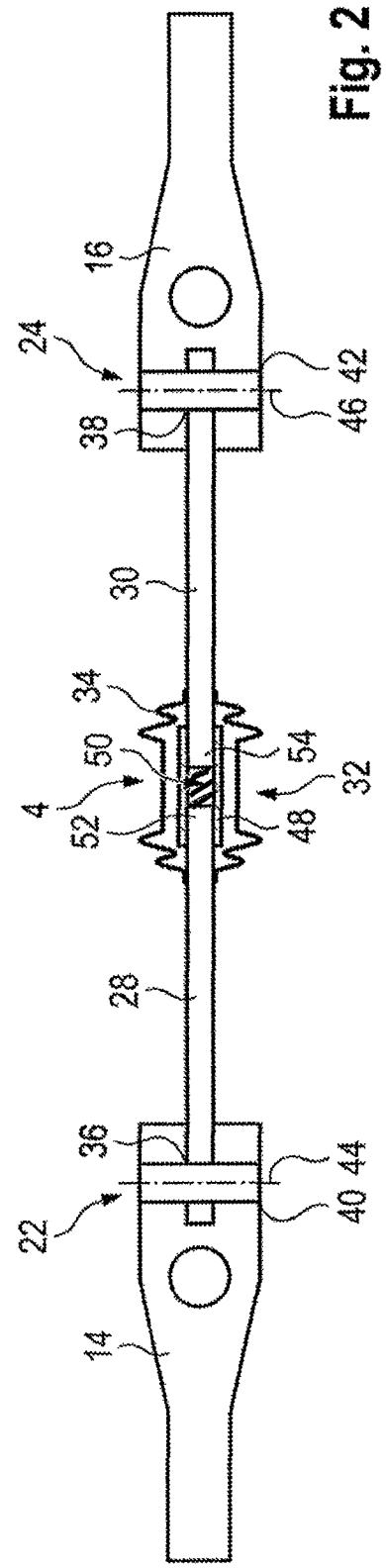
FIG. 2 shows a diagrammatic view of the vehicle axle arrangement according to aspects of the invention from FIG. 1.

Furthermore, the vehicle axle arrangement 4 runs substantially in the vehicle transverse direction and is connected via bearing arrangements 22, 24 to the transverse links 14, 16 at the ends which are directed toward the wheel supports 6, 8 and therefore to the wheels which are not shown in further detail. Here, the wheel-steering vehicle axle arrangement 4 has a spring arrangement 26 which consists of two leaf springs 28, 30 of identical configuration and a coupling member 32 which is shown in FIG. 2. The coupling member 32 is covered in FIG. 1 by way of a gaiter member 34 which shields the coupling member 32 and protects it against contamination. Furthermore, it can serve as a possible lubricant reservoir.

In the present exemplary embodiment, the bearing arrangements 22, 24, via which the spring arrangement 26 is connected to the transverse links 14, 16, are configured as bolt-shaped articulated connections (see FIG. 2).

FIG. 2 shows a diagrammatic view of the vehicle axle arrangement 4 according to aspects of the invention. The bearing arrangements 22, 24 are configured as bolt-shaped articulated connections, to which end the leaf springs 28, 30 in each case have an opening 36, 38 as, bearing means. Bolts 44, 46 are then plugged through said openings 36, 38 and corresponding openings 40, 42 in the transverse links 14, 16.

In the present exemplary embodiment, the coupling member 32 consists of a housing part 48, which is configured here as a plain bearing, and a spring member 50 which is configured as a rubber element.

Instead of the rubber element 50, a spiral spring might also be provided (represented by the spiral element shown in FIG. 2) for connecting the ends of the leaf springs 28 and 30, for example. In the plain bearing 48, the ends 52, 54 which face away from the wheels are mounted movably in the housing part 48 which is configured as a plain bearing, and are coupled to one another via the rubber element 50.

In addition, the coupling member 32 can be used for the variable adjustment of the spring rates. It is provided here that the coupling member 32 can have its length and/or stiffness changed in an active manner, with the result that an active adaptation of the spring rates is made possible.

What is claimed is:

1. A vehicle axle arrangement of a vehicle wheel suspension system for a vehicle comprising:
   a spring arrangement that runs substantially in a vehicle transverse direction in an installed position,
   bearings at each end of the spring arrangement which are directed toward the wheels,
   wherein the bearings are connected via respective bearing arrangements to transverse links which are in turn connected to wheel supports,
   the transverse links being coupled to a vehicle body of the vehicle, and
   wherein the spring arrangement has two leaf springs which are connected to one another via a coupling member,
   wherein the coupling member has a housing part and a spring member which is provided in said housing part,
   wherein the spring member is positioned between and interconnects ends of the leaf springs that face each other and are positioned within the housing part.

2. The vehicle axle arrangement as claimed in claim 1, wherein the spring member is a rubber element.

3. The vehicle axle arrangement as claimed in claim 1, wherein the spring member is a spiral spring.

4. The vehicle axle arrangement as claimed in claim 1, wherein the housing part is a plain bearing, in which ends of the leaf springs which face away from the wheels are mounted.

5. The vehicle axle arrangement as claimed in claim 1, wherein a plain bearing element which absorbs a sliding movement is arranged on the leaf springs.

6. The vehicle axle arrangement as claimed in claim 1, further comprising a gaiter member that shields the coupling member.

7. The vehicle axle arrangement as claimed in claim 1, wherein each bearing arrangement is a bolt-shaped or pin-shaped articulated connection.

8. The vehicle axle arrangement as claimed in claim 1, wherein each transverse link is connected to one of the leaf springs.

\* \* \* \* \*